United States Patent [19]

Gust

[11] Patent Number: 5,102,285

[45] Date of Patent: Apr. 7, 1992

[54] TRAILER WITH CONTINUOUS CONVEYER BED

[75] Inventor: Jacob N. Gust, West Fargo, N. Dak.

[73] Assignee: J. D. Enterprises, Inc., West Fargo, N. Dak.

[21] Appl. No.: 565,890

[22] Filed: Aug. 9, 1990

Related U.S. Application Data

[63] Continuation of Ser. No. 274,088, Nov. 21, 1988, abandoned.

[51] Int. Cl.⁵ .............................................. B65G 17/12
[52] U.S. Cl. ...................................... 414/528; 198/849
[58] Field of Search ................... 414/527, 528, 327; 198/525, 836.1, 816, 844.1, 847, 849

[56] References Cited

U.S. PATENT DOCUMENTS

| | | | |
|---|---|---|---|
| 2,019,389 | 10/1935 | Bogaty | 198/849 |
| 2,626,041 | 1/1953 | Ipsen | 198/849 X |
| 2,725,975 | 12/1955 | Franz | 198/816 X |
| 2,756,972 | 7/1956 | Stokes et al. | 198/525 X |
| 3,024,893 | 3/1962 | Lambert | 198/836.1 |
| 3,259,228 | 7/1966 | Wilding | 198/836.1 |
| 3,329,256 | 7/1967 | Elgaway | 198/849 X |
| 3,344,909 | 10/1967 | Hansen et al. | 198/836.1 |
| 3,399,466 | 9/1968 | Hartley | 198/525 X |
| 3,481,647 | 12/1969 | Cook | 414/527 X |
| 3,647,096 | 3/1972 | Holland | 414/528 |
| 3,707,222 | 12/1972 | Hartley | 198/525 X |
| 4,023,689 | 5/1977 | Taylor et al. | 414/327 |
| 4,055,265 | 10/1977 | Eisenman | 414/528 X |
| 4,149,642 | 4/1979 | Schneider | 414/528 X |
| 4,231,471 | 11/1980 | Gordon | 198/836.1 |
| 4,375,845 | 3/1983 | Chambers et al. | 198/816 X |
| 4,568,237 | 2/1986 | Kraus et al. | 414/528 X |
| 4,630,988 | 12/1986 | LaRue | 414/327 |
| 4,664,583 | 5/1987 | Gust | 414/528 |
| 4,790,715 | 12/1988 | Alexander | 414/528 X |

FOREIGN PATENT DOCUMENTS

| | | | |
|---|---|---|---|
| 52-44073 | 4/1977 | Japan | 414/327 |
| 1256691 | 12/1971 | United Kingdom | 198/836.1 |
| 2087337 | 5/1982 | United Kingdom | 198/836.1 |

Primary Examiner—David A. Bucci
Assistant Examiner—Robert S. Katz
Attorney, Agent, or Firm—Merchant, Gould, Smith, Edell, Welter & Schmidt

[57] ABSTRACT

A trailer assembly is disclosed for receiving, transporting and discharging flowable bulk material. The trailer assembly includes a pair of opposing generally vertical side walls which are secured to a frame member and converged downwardly and inwardly. Flexible flap members extend downwardly from the bottom edges of the side walls. The side walls are joined by a front end wall and a rear wall to define a bin having an open floor. A conveyor is provided as a floor for the bin with the conveyor extending beneath the side walls and having a width greater than the distance between bottom edges of the side walls and positioned closely adjacent to the terminal edges of the flexible flap members. The conveyor includes a pair of opposing endless chains which are mounted about sprockets with the chains connected by cross members. The conveyor includes a continuous belt member secured to the cross members at intervals. Upper tracks of the chains are supported by a support bar secured to the frame member and having a vertical portion which extends between chain links to engage link pins in supporting rolling engagement.

19 Claims, 4 Drawing Sheets

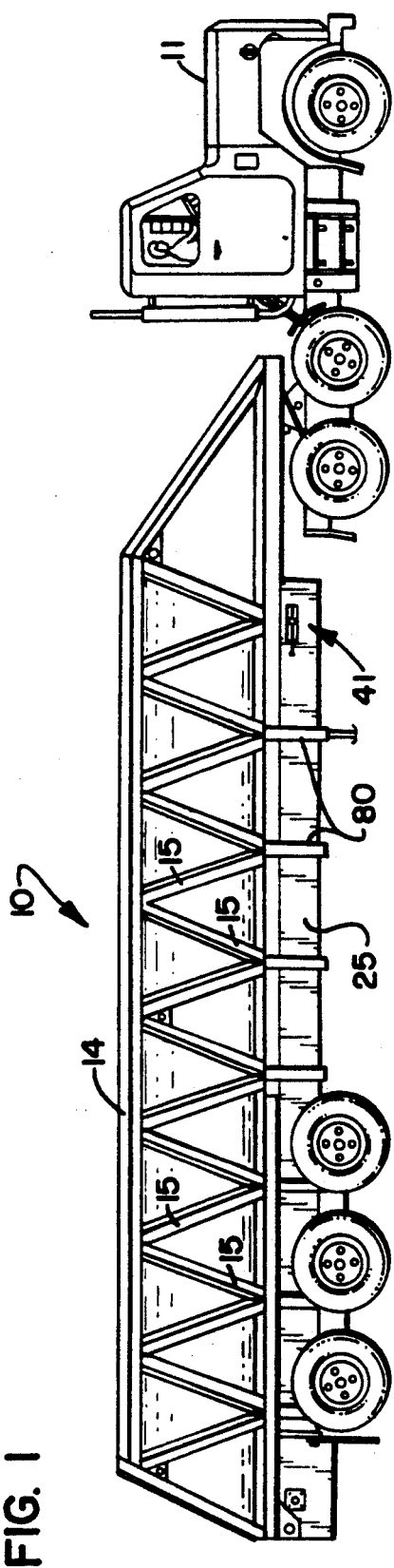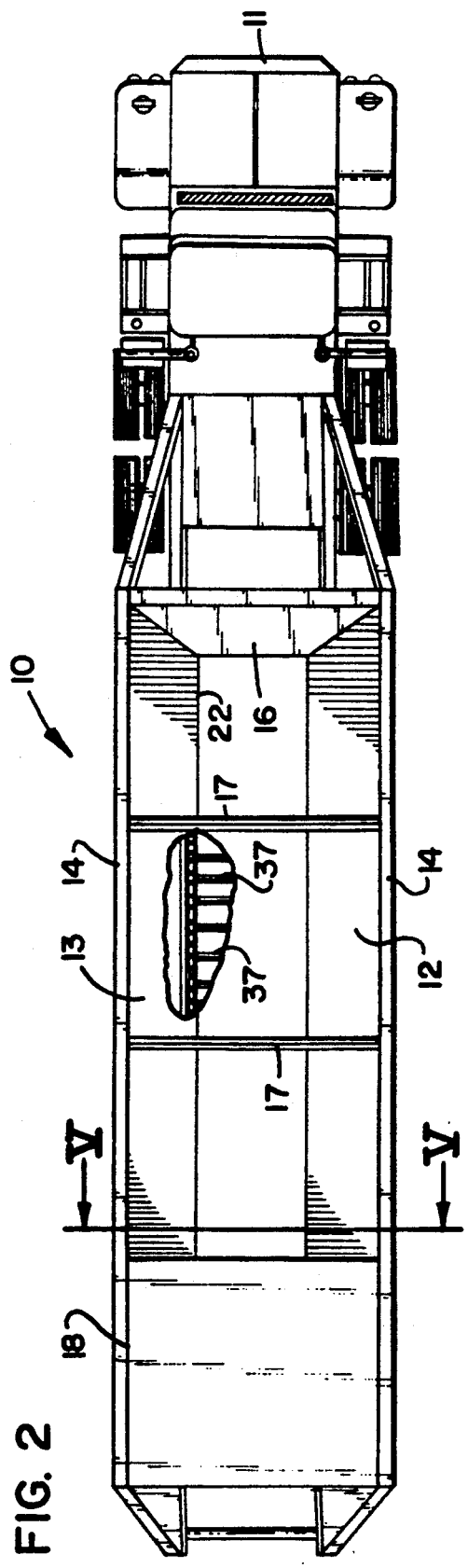
FIG. 1
FIG. 2

TRAILER WITH CONTINUOUS CONVEYER BED

This is a continuation of application Ser. No. 07/274,088, filed Nov. 21, 1988, now abandoned.

BACKGROUND OF THE INVENTION

I. Field of the Invention

This invention relates to a trailer assembly for receiving, transporting and discharging flowable bulk material. More particularly, this invention pertains to such an assembly having a bin with a conveyor as the bin floor.

II. Description of the Prior Art

Trailer assemblies comprising bins with conveyors located at the floor of the bin are well known. Examples of these are U.S. Pat. No. 2,496,463 to Gaddis; U.S. Pat. No, 3,876,089 to Moser and U.S. Pat. No. 4,055,265 to Eisenman. The Eisenman patent teaches a bulk bed material carrier for receiving, transporting, and discharging bulk quantities of material. Specifically, the Eisenman patent teaches a bulk bed material carrier for agricultural products.

While bulk bed material carriers with conveyor floors are well known, the use of such carriers in certain applications has resulted in certain difficulties. Specifically, it would be desirable to use such carriers in the construction industry to haul flowable bulk material such as aggregate. Also, it would be desirable to use such carriers to haul asphalt using the conveyor floor to discharge the asphalt at a metered rate during road paving operations. An example of such a trailer assembly for use in the construction trades is a trailer marketed under the trade name Flow Boy Model 24B by the J.H. Holland Company. The Flow Boy model has opposing chains connected by horizontal transverse rails which scrape across the top of a bin floor. Such an arrangement carries asphalt out of the bin. However, this arrangement can have disadvantages with aggregate which is abrasive and can damage the rails or the floor. Also, such an arrangement is not practical with wet concrete. An example of a bulk bed material carrier which may be used with concrete, as well as other bulk materials, is disclosed in U.S. Pat. No. 4,664,583 to Gust. The Gust '583 carrier, however, has a plurality of belt sections which effectively cover or overlap links of chains attached to which the belt section are attached for movement. Thus, if abrasive material becomes caught in the chain, the belt sections prevent the material from escaping. Damage to the conveyor mechanism may result from the presence of foreign particles in the chain.

OBJECTS AND SUMMARY OF THE INVENTION

It is an object of the present invention to provide a trailer assembly for handling flowable bulk material with a conveyor floor for discharging the material.

Another important object of the present invention is to provide a trailer assembly having a conveyor floored bin which avoids contamination of the conveyor mechanism by handled material.

A still further object of the present invention is to provide a trailer assembly with a conveyor floor which minimizes power requirements to operate the conveyor when it is carrying a heavy load.

According to a preferred embodiment of the present invention, a trailer assembly for receiving, transporting, and discharging flowable bulk material is provided which includes a frame member which supports a pair of generally vertical opposing side walls which converge downwardly and inwardly. Flexible flaps having terminal edges extend from bottom edges of the side walls. A front end wall is secured to the frame member and extends between the side walls as does a rear end wall which is secured to the frame member. The rear end wall is provided with a horizontal pivot at its upper connection to the side walls permitting the rear end wall to pivot away from the side walls and define a discharge opening. The rear end wall, front end wall and side walls cooperate to define a floorless bin for receiving flowable bulk material. The trailer assembly further comprises a conveyor which defines a movable floor for the bin. The conveyor system includes a pair of endless chains which move around sprockets secured to the frame member. The chains are spaced apart a distance greater than the width of the bottom of the bin and include support members extending inward from the sides of the chains.

BRIEF DESCRIPTION OF THE DRAWINGS

FIG. 1 is an elevation view of a trailer assembly attached to a cab;

FIG. 2 is a top view of the trailer assembly and cab of FIG. 1 with a portion of the bin broken away;

DETAILED DESCRIPTION OF THE PREFERRED EMBODIMENT

Figure 3:
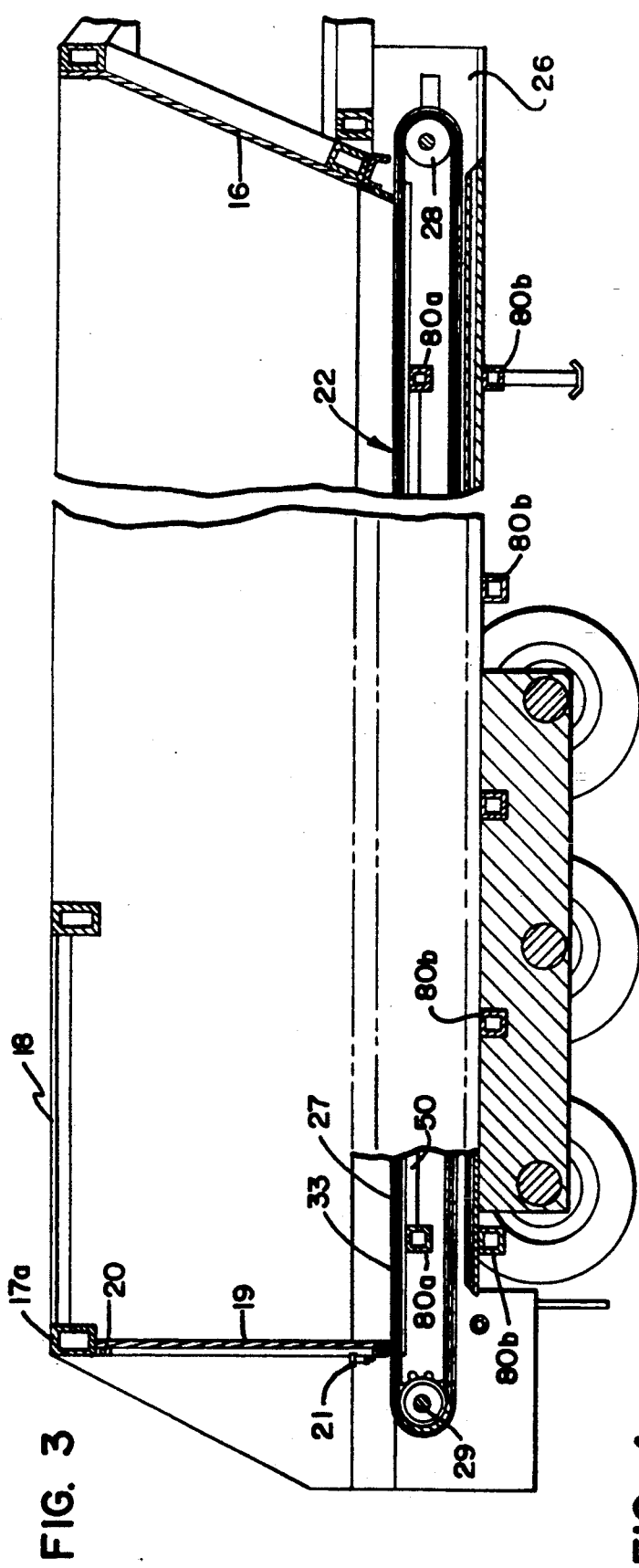
FIG. 3 is a view of the trailer assembly taken along line III—III in FIG. 2.

FIGS. 1 and 2 show a trailer assembly generally designated by the numeral 10 mounted to the frame of a cab 11. The trailer assembly includes a pair of opposing side walls 12 and 13 which are generally vertical and converge downwardly and inwardly. As it is intended that the present invention would be particularly suitable for conveying heavy construction material, the side walls 12 and 13 are braced by rectangular steel bracing 14 which surrounds the perimeter of the side walls. Cross bracing 15 further supports the side walls and joins the upper bracing and lower bracing 14. The trailer assembly 10 also includes a forward wall 16 which is generally vertical and joins the forward edges of the side walls 12 and 13. Rigid lateral supports 17 and roof portion 18 extend between the upper edges of side walls 12 and 13 and provide additional rigid structural support. As best shown in FIG.3, a rear wall 19 is provided having a horizontal and transverse pivot connection 20 to a brace 17a extending between side walls 12 and 13 at the rearward end of the side walls. A latch 21 secures the rear wall in a closed position as shown in FIG. 3. Rear wall 19, forward wall 16 and side walls 12 and 13 cooperate to define a bulk material bin 10a.

Figure 5:
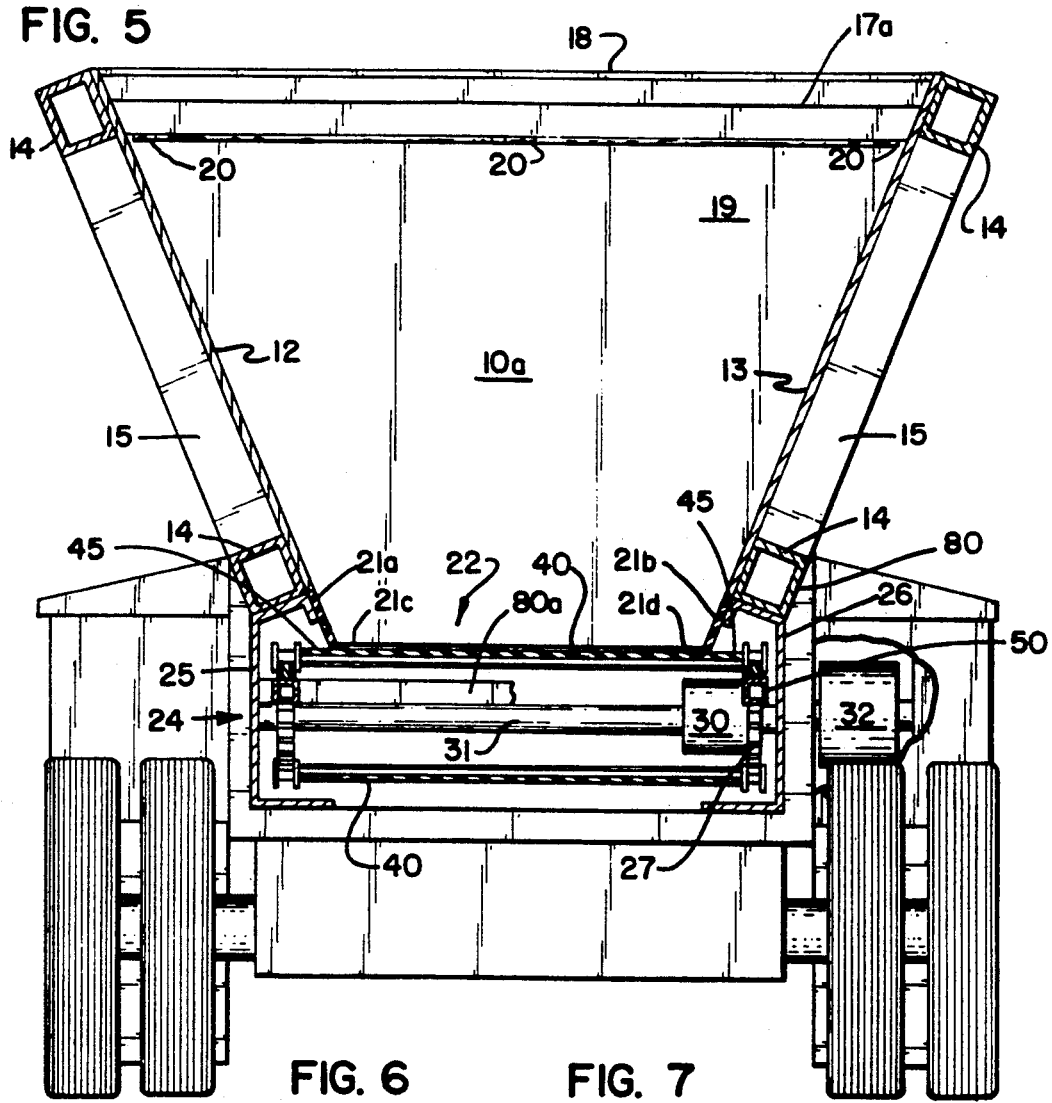
FIG. 5 is a view generally taken along line V—V of FIG.3.

Flexible flap members 21a and 21b extend from lower edges of side walls 12 and 13. The floor of the bulk material bin is a moving conveyor which is generally shown at 23. The flap members 21a and 21b terminate at edges 21c and 21d in close proximity to the conveyor 23. With reference to FIGS. 5 and 3, it can be seen that the trailer assembly is provided with a frame member 24 which comprises a pair of vertical spaced apart support plates 25 and 26. The support plates 25 and 26 support the side walls 12 and 13 respectively. Vertical braces 80 are provided at spaced intervals on both of plates 25 and 26 and are provided with lower horizontal braces 80b and upper horizontal braces 80a to provide rigid structural support.

The support plates 25 and 26 support a pair of transversely spaced endless chain mechanisms 27 defining upper and lower tracks. It will be appreciated that both endless chains are identical and a description of one will suffice as the description of the other and all identical parts will be numbered identically. Shown most clearly in FIG. 3, the chain mechanism 27 includes an idler sprocket 28 secured to the frame member forward of the bottom edge of the forward wall 16. The idler sprocket 28 is mounted for rotation about a horizontal axis transverse to the support member support plates 25 and 26. Likewise, a driven sprocket 29 is mounted on the support member rearward of the rear wall 19. The driven sprocket 29 is mounted for rotation about an axis parallel to the axis of the idler sprockets 28. As shown in FIG. 5, the driven sprockets 29 are joined by means of a coupler 30 to a common shaft 31 with both of the sprockets driven by means of a power source 32.

Figure 4:
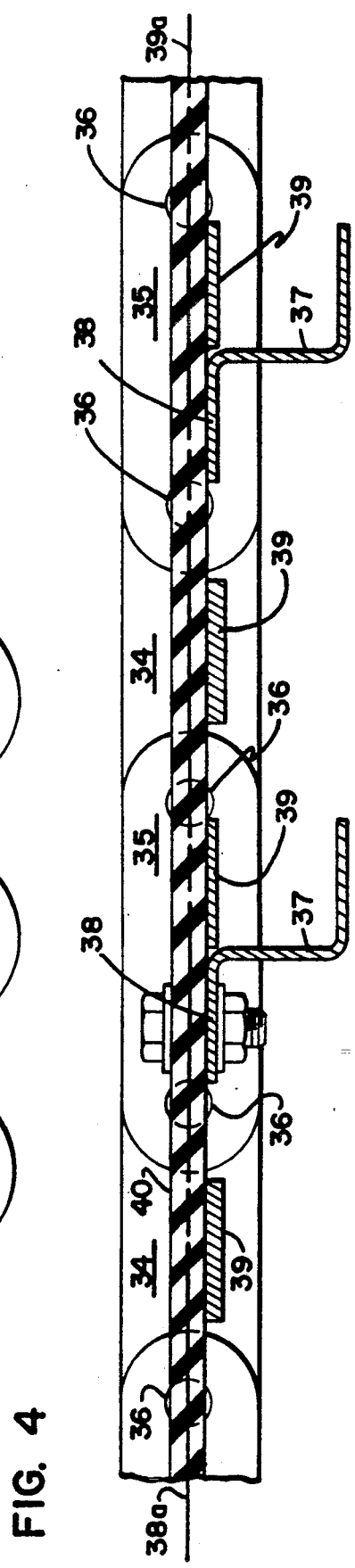
FIG. 4 is a view taken in elevation showing a chain mechanism enlarged.
Figure 7:
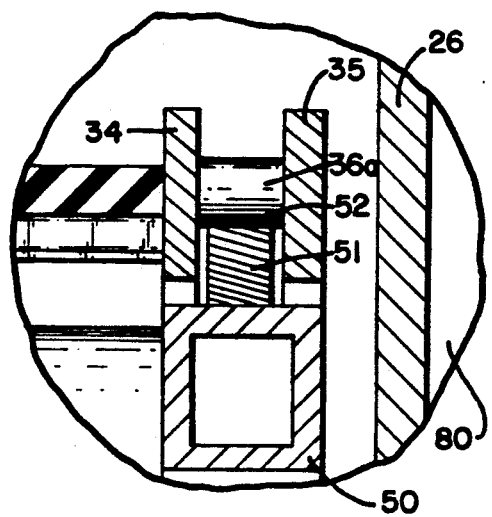
FIG. 7 is an enlarged portion of a view of FIG.6 showing support means for the chain assembly.

With reference to FIGS. 3 and 4, the chain mechanism 27 includes an endless link chain 33 which is entrained in meshing engagement about the drive sprocket 29 and idler sprocket 28. The link chain 33 comprises a plurality of inner links 34 and outer links 35 alternately arranged with an inner link 34 connected to a contiguous outer link 35 by means of a common pivot pin 36. As shown in FIGS. 7 and 4, the pivot pins 36 are each surrounded by cylindrical rollers 36a. The pair of link chains 33 are interconnected by means of transverse cross members 37 which extend between opposing outer links 35. As shown in FIG. 4, the cross members 37 have a Z-shaped cross section with a generally flat upper surface 38 generally slightly below the longitudinal, horizontal centerline 38a of links 34 and 35. The term "below" is used only for convenience in referring to the portion of the upper track in FIG. 4; it will be understood that the upper surface 38 would be slightly above the longitudinal, horizontal centerline 38a of the links 34, 35 on the lower track. Further, a support member or plate 39 is fixed to each inner link 34, extending generally inwardly and perpendicularly to inner links 34.

A continuous flexible conveyor belt or belt member 40 is supported by support member 39 and by the upper surface 38 of Z-shaped cross members 37. The belt 40 has a width less than the transverse distance between the inner surfaces of opposite inner links 34 of chains 27. Further, the belt 40 is supported such that the belt centerline 39a lies horizontally coplanar with the link centerline 38a, as best shown in FIG. 4. The belt 40 is fixed to transverse cross members 37 by elevator bolts preferably at four foot intervals along the length of the belt.

Figure 8:
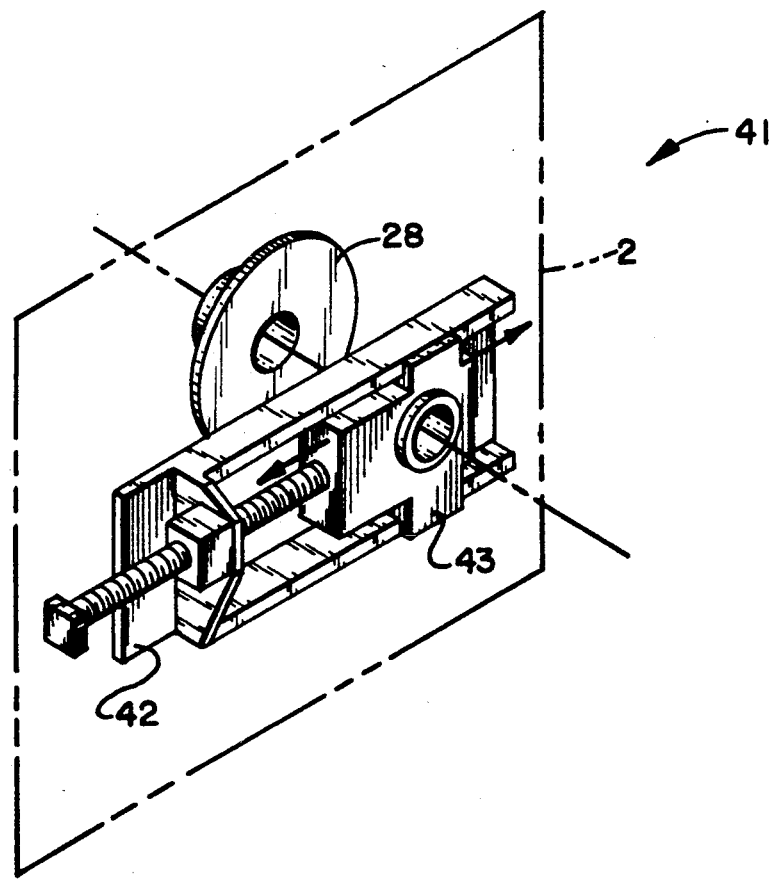
FIG. 8 is an enlarged portion of FIG. 3 showing tension adjustment means for the chain assembly.

The chain mechanism 27 further includes opposing similar tension adjustment means 41 as shown in FIG. 8. Each tension adjustment means 41 includes a first fixed member 42 fixed to support plate 25 and 26, respectively, and a second slidable member 43 slidably fixed to the first fixed member 42. The idler sprocket 28 upon which the chains 33 ride is fixed to the slidable member 43. When the slidable member 43 is linearly displaced relative to the fixed member 42, the idler sprocket 28 is accordingly linearly displaced relative to the driven sprocket 29. In this manner, the tension of the chains 33 and, thereby, the tension of the belt 40, can be adjusted.

As shown most clearly in FIG. 5, the chains 33 are arranged such that the distance between the chains is greater than the width of the distance between the side walls at their bottom edge. With this arrangement, the belt 40 extends beyond the bottom edges of the side walls 12 and 13. Likewise, the chains 33 are positioned such that the belt section 40 is in close proximity to the bottom edges of the side walls 12 and 13. Accordingly, only a portion of the belt 40 is exposed to the interior of the bin with the exposed portions acting as the floor of the bin. Also, the portions of the belt 40 extending beyond side walls 12 and 13 are sized to have a width sufficient such that the extended portions act as supplementary conveyors 45 outside the bin 10a.

Figure 6:
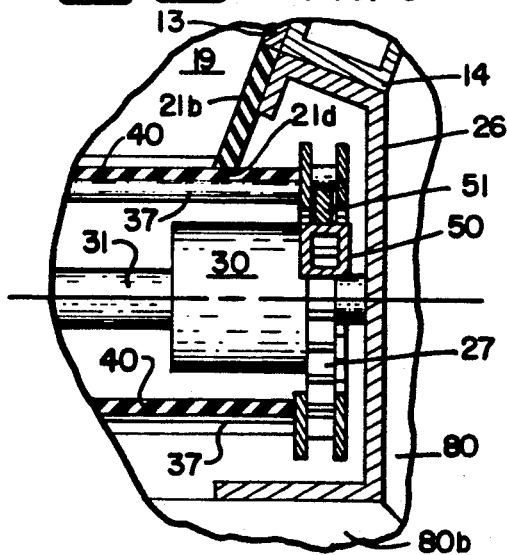
FIG. 6 is an enlarged portion of FIG.5 showing the sprocket and chain assembly.

The frame member 24 carries means for supporting the chains and belt; these means are most clearly shown in FIGS. 6 and 7. To support the upper track of the link chain 33, a support tube 50 is provided. The support tube 50 is positioned beneath the upper track of the link chain 33 and extends approximately the complete length of the chain between the sprockets 28 and 29. The tube 50 extends between upper horizontal braces 80a and has an upper surface flush with the upper surfaces of braces 80a with tube 50 welded to braces 80a. The support tube 50 is provided with a vertical support 51 which is sized to extend between vertical link plates 34 and 35 of all of the chain links with an upper bearing surface 52 of the vertical support 51 engaging rollers 36a in rolling support.

In operation of the trailer assembly, the rear wall 19 is pivoted to its closed position as shown in FIG. 3 and secured in the position by means of latch 21. Material to be transported by the trailer is passed into the top of the bin between the support bars 17. The material rests on the portion of the belt 40 exposed to the interior of the bin 10a. The carried material is kept within the bin 10a by means of the close proximity between the belt 40 and the terminal edges 21c and 21d of the flexible flap members 21a and 21b. Also, the weight of the material results in the belt 40 and their supporting cross members 37 becoming slightly concave thereby reducing the clearance between the belt 40 and the flexible flap members 21a and 21b. Structural support for the belt 40 is provided by the cross members 37 and by support members 39 which eliminate the need for a rigid floor. Additionally, any sagging of the belt 40 on the upper track near its longitudinal center prevents migration of the carried material past the sides of the belt 40 since the concave shape tends to draw the material back towards the center of the belt.

When it is desired to discharge carried material from the bin, latch 21 is released and the rear wall 19 is free to pivot about the pivot axis of transverse pivot connection 20. The rear wall may be supported open in any desired manner or could be left to freely pivot with the weight of the conveyed material keeping the rear wall 19 in an open position. With the rear wall 19 freely pivotable, the power means is activated and the chains 33 rotate about the sprockets 28 and 29 drawing the belt 40 in a circular path with the upper track moving toward the rear wall 19 and the lower track moving toward the forward wall 16 with the result that the carried material is drawn by the belt 40 out of the bin and discharged.

Since the belt 40 is fixed at intervals to cross members 37 which are, in turn, fixed to inner links 34 of the chains 27, belt 40 remains generally coplanar with the chains 27 along the lower track.

In addition to allowing bulk material to easily be removed from the exposed chain without removing the relatively heavy belt 40, the present invention also provides for improved power requirements for the chain assembly since the chains are supported by the vertical support 51 which engages the rollers 36a. This results in greatly reduced friction and greatly reduces the load on the power source because the chain rolls instead of slides. Further, the Z-shaped cross members 37 eliminate need for a floor.

From the foregoing, it has been shown that the present invention provides a trailer assembly for receiving, transporting, and discharging flowable bulk material with the trailer assembly including a bin having a conveyor floor. Specifically, it has been shown how the present invention provides such a trailer assembly while preventing damage to the conveyor assembly by allowing convenient access to the chains for removing material caught therein and for allowing caught material to free itself.

What is claimed is:

1. A trailer assembly for receiving, transporting and discharging flowable bulk material comprising:

a frame member;

a pair of opposing generally vertical side walls secured to said frame member and converging downwardly and inwardly;

a front end wall secured to said side walls;

a rear wall secured to said side walls;

opposing surfaces of said rear wall, side walls and front end wall defining a bin for receiving bulk material;

bottom edges of said rear wall, side walls and front end wall defining an exposed opening at a bottom of said bin;

bin discharge means provided on said rear wall;

a conveyor disposed beneath said bottom edges and in close proximity thereto and defining a movable floor for said bin and covering said opening; said conveyor including a drive sprocket means having two spaced apart drive sprockets rotatably mounted to said frame member about a transverse horizontal axis at said rear end;

an idler sprocket means having two spaced apart idler sprockets rotatably mounted to said frame member about a transverse horizontal axis at said front end with opposing idler and drive sprockets spaced apart distances greater than a distance between bottom edges of said side walls;

a pair of endless chains interconnected by a plurality of longitudinally spaced transverse cross members; said chains being entrained in meshing engagement about said drive and idler sprocket means with said entrained chains defining coplanar upper and lower chain tracks;

means secured to said frame member for supporting said chains along said upper chain track;

power means operatively connected to said drive sprocket means for moving said upper chain track of said chains in a rearward direction;

a flexible, continuous belt member having a substantially continuous surface over the entire length of said belt member and fixed to said transverse members, such that said belt defines parallel, planar upper and lower belt tracks, said upper belt track substantially coplanar with said upper chain tracks and said lower belt track substantially coplanar with said lower chain track; said belt member sized to have a width transverse to said side walls greater than said distance between bottom edges of said walls; and flexible flaps secured to said side walls and terminating at edges in close proximity to said continuous belt member and disposed inwardly of said edges of said continuous belt member.

2. A trailer assembly according to claim 1, wherein said belt has a width not greater than the transverse distance between said endless chains; said belt being fixed to said chains generally coplanar with a horizontal centerline of said chains.

3. A trailer assembly according to claim 1, further comprising a chain tension adjustment means including:
   (a) a first member fixed to said frame member;
   (b) a second member slidably fixed to said first member; and
   (c) a means for linearly displacing second member relative to said first member.

4. A trailer assembly according to claim 3, wherein said means for moving said tension adjustment means second member includes an elongate threaded member engaging said first fixed member and said second movable member such that rotation of said threaded member causes linear displacement of said second movable member with respect to said first fixed member.

5. A trailer assembly according to claim 3, wherein said second member is fixed to said idler sprocket.

6. A trailer assembly according to claim 1, wherein said frame member includes a pair of generally vertical opposing support plates with said idler and drive sprockets secured to said plates.

7. A trailer assembly according to claim 1, wherein said chains are link chains with links comprised of opposing vertical link plates joined by horizontal pin means; said means for supporting said upper track comprising a support rail secured to said frame member and extending the length of the upper track and sized to extend between vertical link plates with an upper bearing surface of said support rail engaging said pin means in support.

8. A trailer assembly according to claim 7, wherein said trailer assembly further comprising horizontal support members fixed to one of said vertical link plates and extending beneath an edge of said conveyor belt member, such that said horizontal support member supports said conveyor belt member on said upper track.

9. A trailer assembly according to claim 7, wherein said pin means comprise link pins joining said link plates with said link pins provided with coaxial cylindrical rollers with said rollers engaging said upper bearing surface.

10. A trailer assembly according to claim 1, wherein said continuous belt is fixed at intervals to said transverse cross members.

11. A trailer assembly according to claim 1, wherein said continuous belt has a width less than the transverse distance between said chains.

12. A trailer assembly according to claim 8, wherein said transverse cross members are fixed to said link plates offset from and parallel to the longitudinal centerline of said link plates.

13. A trailer assembly according to claim 12, wherein said conveyor belt member is horizontally coplanar with said link plate longitudinal centerline.

14. A trailer assembly for receiving, transporting and discharging flowable bulk material comprising:
   a frame member having a pair of generally vertical opposing support plates;
   a pair of opposing generally vertical side walls secured to each of said support plates and converging downwardly and inwardly to bottom edges with bottom edges of said side walls spaced apart a distance less than a distance between said support plates;
   a front end wall secured to said side walls;
   a rear wall secured to said side walls;
   opposing surfaces of said rear wall, said walls and front end defining a bin for receiving bulk materials;
   bottom edges of said rear wall, side walls and front end wall defining an exposed opening at a bottom of said bin; p1 bin discharge means provided on said rear wall;
   a pair of opposing idler sprockets rotatably mounted to each of said support plates with said idler sprockets rotatable about a transverse horizontal axis at said front end with said idler sprockets spaced apart a distance greater than the distance between bottom edges of said side walls;
   a pair of drive sprockets rotatably mounted on each of said support plates and rotatable about a transverse horizontal axis at said rear end with said drive sprockets spaced apart a distance greater than a distance between bottom edges of said side walls;
   a pair of endless link chains each being entrained in meshing engagement about drive and idler sprockets on a common support plate with said endless link chains defining parallel, planar upper and lower chain tracks, said link chains comprising links having opposed vertical line plates joined by horizontal pin means;
   power means operatively connected to said drive sprockets for rotating said drive sprockets and moving said upper track of said chains in a rearward direction;
   a plurality of spaced transverse cross members connecting a plurality of opposing links of said endless chains;
   a flexible, continuous conveyor belt member having a substantially continuous surface over the entire length of said belt member and having a width not greater than the transverse distance between said endless chains; said belt members fixed at intervals to said transverse cross members, with central portions of said belt members on said upper track exposed to an interior of said bin and with said belt member on said upper track in close proximity to said bottom edges, side portions of said belt member extending from said central portions beyond and beneath said bottom edges of said side walls;
   said conveyor belt member sized to have a width transverse to said side walls greater than said distance between said bottom edges of said side walls; and
   flexible flaps secured to said side walls and terminating at edges in close proximity to said continuous belt member and disposed inwardly of side edges of said continuous belt member;
   a pair of support rails secured to each of said opposing support plates and extending inwardly beneath an upper track of said chains with said support rails provided with a vertical support member extending the length of said upper track and sized to extend between vertical link plates of said chain links with an upper bearing surface of said vertical support engaging said chains in support.

15. A trailer assembly according to claim 14, wherein said trailer assembly further comprises a tension adjustment means including:
   (a) a first member fixed to said frame member;
   (b) a second member slidably fixed to said first member; and
   (c) a means for linearly displacing said second member with respect to said first member.

16. A trailer assembly according to claim 15, wherein said transverse cross members are fixed to said link plates below the longitudinal centerline of said chain links.

17. A trailer assembly according to claim 16, wherein said conveyor belt member is horizontally coplanar with said chain link centerline.

18. A trailer assembly according to claim 14, wherein said pin means includes link pins joining said link plates, with said link pins provided with coaxial cylindrical rollers with said rollers engaging said upper bearing surface.

19. A trailer assembly for receiving, transporting and discharging flowable bulk material comprising:
   a frame member having a pair of generally vertical opposing support plates;
   a pair of opposing generally vertical side walls secured to each of said support plates and converging downwardly and inwardly to bottom edges with bottom edges of said side walls spaced apart a distance less than a distance between said support plates;
   a front end wall secured to said side walls;
   a rear wall secured to said side walls;
   opposing surfaces of said rear wall, side walls and front end defining a bin for receiving bulk material;
   bottom edges of said rear wall, side walls and front end wall defining an exposed opening at a bottom of said bin;
   bin discharge means provided on said rear wall;
   a pair of opposing idler sprockets rotatably mounted to each of said support plates with said idler sprockets rotatable about a transverse horizontal axis at said front end with said idler sprockets spaced apart a distance greater than the distance between bottom edges of said side walls;
   a pair of drive sprockets rotatably mounted on each of said support plates and rotatable about a transverse horizontal axis at said rear end with said drive sprockets spaced apart a distance greater than a distance between bottom edges of said side walls;
   a pair of endless link chains each being entrained in meshing engagement about drive and idler sprockets on a common support plate with said endless link chains defining parallel, planar upper and lower chain tracks, said link chains comprising links having opposed vertical link plates joined by horizontal pin means;

power means operatively connected to said drive sprockets for rotating said drive sprockets and moving said upper track of said chains in a rearward direction;

a plurality of spaced transverse cross members connecting a plurality of opposing links of said endless chains;

a flexible, continuous conveyor belt member having a substantially continuous surface over the entire length of said belt member and fixed at intervals to said transverse cross members, with central portions of said belt member on said upper track exposed to an interior of said bin and with said belt member on said upper track in close proximity to said bottom edges, side portions of said belt member extending from said central portions beyond and beneath said bottom edges of said side walls;

said conveyor belt member sized to have a width transverse to said side walls greater than said distance between said bottom edges of said side walls; and flexible flaps secured to said side walls and terminating at edges in close proximity to said continuous belt member and disposed inwardly of side edges of said continuous belt member;

a pair of support rails secured to each of said opposing support plates and extending inwardly beneath an upper track of said chains with said support rails provided with a vertical support member extending the length of said upper track and sized to extend between vertical link plates of said chain links with an upper bearing surface of said vertical support engaging said chains in support; and tension adjustment means including first members fixed to said support plates, second members slidably fixed to said first members and fixed to said idler sprockets, and a means for linearly displacing said second members with respect to said first members; said second members fixed to said idler sprockets.

* * * * *